United States Patent
Benayon et al.

[19]

[11] Patent Number: 6,154,823
[45] Date of Patent: Nov. 28, 2000

[54] METHOD OF RECOGNIZING FIXED AND VARIABLE SIZED DATA OBJECTS IN MEMORY

[75] Inventors: Jay William Benayon, Thornhill; Brian Ward Thomson, North York, both of Canada

[73] Assignee: International Business Machines Corporation, Armonk, N.Y.

[21] Appl. No.: 09/067,578

[22] Filed: Apr. 28, 1998

[30] Foreign Application Priority Data

Jul. 31, 1997 [CA] Canada .................................. 2212316

[51] Int. Cl.⁷ ...................................................... G06F 12/02
[52] U.S. Cl. ............................................. 711/171; 711/170
[58] Field of Search ..................................... 711/170, 171, 711/172, 173; 707/205

[56] References Cited

U.S. PATENT DOCUMENTS 5,109,336   4/1992   Guenter et al. ........................ 711/171
5,420,999   5/1995   Mundy .................................... 711/173

*Primary Examiner*—Kevin L. Ellis
*Attorney, Agent, or Firm*—Scully, Scott, Murphy & Presser

[57] ABSTRACT

A method for recognizing fixed size objects and allocating and freeing fixed size data objects in a multiple heap system. The method utilizes a page based structure for allocating fixed size objects. A page or pool of pages is provided for each predetermined object size. Each page includes a reserved area for storing heap handle and object size information which is common to all the objects of the predetermined size for the page. Allocation and de-allocation requests are performed based on the object size. The reserved area in the page includes a recognizable sanity value and the object size for the page. The sanity value denotes a fixed size object. The reserved area also stores two pointers to keep track of a linked list of available and free objects. The remainder of the page is used for the objects. For a de-allocation request, the page containing the object is determined from the address of the object.

10 Claims, 5 Drawing Sheets

METHOD OF RECOGNIZING FIXED AND VARIABLE SIZED DATA OBJECTS IN MEMORY

FIELD OF THE INVENTION

The present invention relates to memory management systems and more particularly to a method for allocating and freeing fixed and variable size data objects in multiple heaps.

BACKGROUND OF THE INVENTION

Various types of software programs store information in memory in the form of "heaps". A heap is a collection of data objects. A heap can be implemented as an array, a linked list or other appropriate data structure as will be understood by those skilled in the art.

In the well-known C programming language, two runtime library routines "malloc( )" and "free( )" are provided for managing data objects in memory. The runtime function malloc( ) is used to allocate memory for storing data objects. The runtime function free( ), on the other hand, is used to free memory for data objects which are no longer being used by the program.

In most current implementations of general heap allocators, specific information about a heap object or data object needs to be encoded in the object during allocation. The information is used when the data object is subsequently released, i.e. "freed". This information typically comprises a "heap handle" and a "size" parameter. The heap handle specifies the heap for a multiple heap system and the size parameter specifies the size of the object typically in bytes. The use of fixed sized pools is a known technique for increasing the performance of an application while at the same time reducing the working set size by eliminating the overhead of internal information within each object allocation. A drawback with known fixed size pool implementations is the need for the user of the pool to provide the "pool handle" during the de-allocation of the object or alternatively to encode the handle within the object itself. For very small data objects, the required overhead is often larger than the original data object. In applications where large numbers of small objects are manipulated, significant demands will be put on the memory resources and execution performance can be affected.

One solution to the overhead problem for small objects has been to store the information outside the object itself. While this solution has been adequate for small fixed sized objects there still remains the problem of recognizing variable sized objects and fixed sized objects in a system. The problem involves the recognition in real time of objects which do not include internally stored information stored or information not specified explicitly by the user in a system having multiple heaps that process fixed and variable sized objects.

BRIEF SUMMARY OF THE INVENTION

The present invention provides a mechanism for allocating and de-allocating objects in a system having multiple heaps.

According to one aspect of the invention, there is a method for recognizing variable size objects and fixed size objects.

According to another aspect of the invention, there is fixed size memory allocator for storing "small" data objects, for example, data objects which are less than 512 bytes in size. The heap handle and object size are stored external to the object and shared with other objects. The small fixed size allocator utilizes a page-based mechanism for allocating the small fixed size data objects. The fixed size object allocator includes a link list, i.e. "free list" of objects available in the pool page or pages.

In a first aspect, the present invention provides a method for allocating fixed and variable size objects in response to an allocation request specifying the size of the object in a data processing system having one or more heaps in memory, the method comprising the steps of: (a) determining if the object to be allocated comprises a fixed size object or a variable size object; (b) if the object is a fixed size object, allocating memory space on a page reserved for fixed size objects having a size at least equal to the size of the object to be allocated, wherein the page includes common information corresponding to the identity and size of all the fixed size objects for that page; and (c) if the object is a variable size object, allocating memory space sufficient for the object size specified in the allocation request and information pertaining to the variable size object being allocated.

In a second aspect, the present invention provides a method for freeing fixed and variable size objects in response to a runtime free request from a user application executing in an operating system having a runtime library specifying the address of the object in memory, the object having been previously allocated in a heap in the memory of the system, the method comprising the steps of: (a) determining a pool page address from the address of the object to be freed and addressing the pool page; (b) determining if the object to be freed is a fixed size object on the basis of a selected value stored in known location on the pool page addressed in step (a); (c) if the object is a fixed size object, freeing the object from the pool page addressed in step (a); (d) if the object is not a fixed size object, addressing the object to be freed and de-allocating the object as a variable size object.

In another aspect, the present invention provides a pool page structure for storing fixed size objects in a data processing system having a heap memory, the pool page structure comprising: (a) a pool page for each fixed size object of interest; (b) each of the pool pages including a header portion and a body portion; (c) the header portion comprising information fields for storing information corresponding to the fixed size object of interest, the information fields including an identification field for identifying the object type for that page and a size field for indicating the size of object reserved for that page; and (d) the body portion providing means for allocating objects of the fixed size for the page.

BRIEF DESCRIPTION OF THE DRAWINGS

Reference will now be made to the accompanying drawings, which show by way of example a preferred embodiment of the present invention and in which.

DETAILED DESCRIPTION OF THE PREFERRED EMBODIMENT

The present invention provides a mechanism for recognizing fixed size objects and a method for allocating and freeing fixed and variable size data objects in a data processing system utilizing one or more heaps. The method according to the present invention is particularly suited for utilization in the runtime library functions malloco and free( ) found in the well-known C programming language, and the runtime functions new( ) and delete( ) in the C++ programming language. However, it is to be understood that the present invention has wider applicability to memory management functions where objects are allocated and de-allocated in memory.

In the C programming language, the library function malloc( ) (i.e. memory allocation) provides dynamic storage allocation for reserving space in memory for a specified number of bytes. The function includes an argument "size" which specifies the number of bytes needed and the function returns a pointer to an area in memory that has the required number of bytes free. This area in memory is then reserved for use by the program. If the function malloc( ) is called again, it will look elsewhere in memory for additional free space, skipping the blocks that have already been reserved. The library function free( ) works in conjunction with malloc( ) to release the memory, i.e. data object, that was previously reserved by malloc( ). When called the function free( ) puts the specified block of memory back on a "free-list" in order to make the block available to malloc( ).

In most systems, data is stored in memory in the form of a heap or multiple heaps. A heap comprises an area in memory which is allocated for runtime storage of data. Heaps are created dynamically through calls from the application to the runtime library. A default heap is set using a function of the form _udefault(heap), and the runtime functions malloc( ) and free( ) are used to allocate and de-allocate objects from the default heap. In a multiple heap system, a runtime function of the form _umalloc(heap, size) is used allocate objects to the 'heap' specified in the parameter list. To de-allocate an object from any heap, a function of the form free(object) is used.

Figure 1:
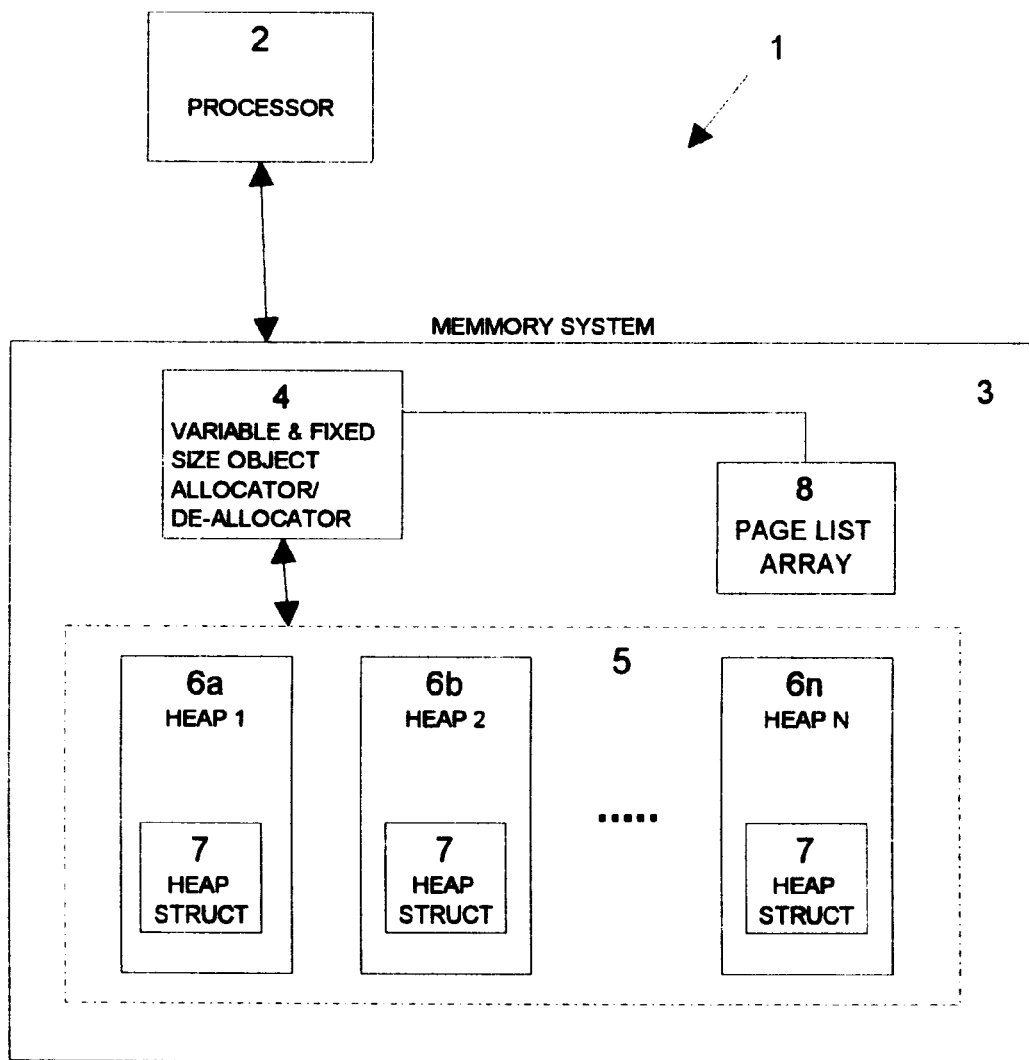
FIG. 1 is a block diagram of a data processing system embodying a variable and fixed size object allocator/de-allocator according to the present invention.

Reference is made to FIG. 1 which schematically depicts a data processing system 1 for operating a variable and fixed size object allocator and de-allocator according to the present invention. The system 1 comprises a processor 2, a memory system 3, and a variable and fixed size object allocator/de-allocator 4. The memory 3 is connected to the processor 2. Runtime storage in the memory 3 is typically arranged in the form of a heap 5. The memory 4 may include multiple heaps, shown individually as 6a, 6b, . . . 6n. In the context of the present invention, the heaps 6 are utilized for storing both variable size objects and fixed size data objects, and the allocator/de-allocator 4 provides a mechanism for distinguishing between the different types of data objects in real time.

As shown in FIG. 1, the variable and fixed size object allocator 4 includes a heap structure 7 and a page list array 8. The heap structure 7 comprises a data structure for each heap 6 which is stored in memory. The allocator 4 uses the heap structure 7 to manage multiple heaps 6 as will be described in more detail below. The page list array 8 comprises an array of the addresses for the pages in the pools and is described in more detail below with reference to FIG. 4.

According to a first aspect of the present invention, there is provided a mechanism for recognizing variable size objects and fixed size objects. A variable size object 100 suitable for this aspect of the present invention is known in the art and described in copending Canadian Patent Application No. 2,136,154 filed Nov. 18, 1994. The variable size object 100 takes the form shown in FIG. 2 and comprises a size field 102, a heap field 104 and a user area 106. The size field 102 defines the size, i.e. number of bytes, in the user area 106. For example, in the C language, the size is passed as argument to the memory allocation function, malloc( ). The heap field 104 stores a heap_anchor which defines in which heap 6 the data object 100 belongs.

The heap_anchor comprises an address pointer which points to the location of the heap structure 7 in memory 3 (FIG. 1). The heap structure 7 is implemented as a data structure of the following form:

struct heap_anchor=(int SANITY_VARIABLE, other related data to the general allocator)

The first word (i.e. 4 bytes) in the heap_anchor comprises a SANITY_VARIABLE. The SANITY_VARIABLE provides a means for identifying a variable size data object with overhead. The SANITY_VARIABLE is implemented as an integer constant with a pre-determined bit pattern, where the bit pattern provides a signature for a variable size object. The heap_anchor structure and the size information is used in a subsequent release operation (e.g. the function free( ) in the C runtime library) to determine the size of the data object and the heap to which it should be returned. A heap_anchor is provided for each user controlled heap. The mechanism for recognizing a fixed size data object according to the invention is described below with reference to FIG. 3.

Figure 2:
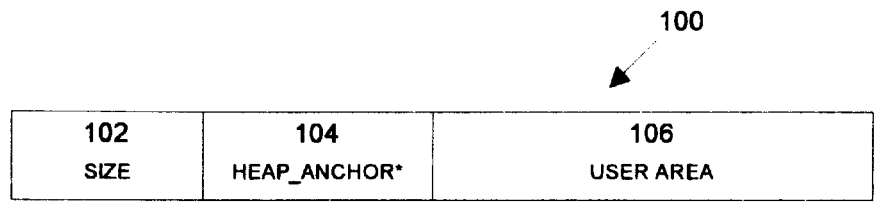
FIG. 2 is a schematic representation of a portion of a variable size data object generated by a variable size allocator according to the prior art.

As shown in FIG. 2, the heap_anchor, i.e. "handle", is encoded in the variable size object 100. By encoding the heap_anchor in the data object 100, the user merely needs to return a pointer to the object 100 and then read the heap_anchor pointer in the heap field 104 to determine which heap 6 (FIG. 1) the object was allocated from. In other words, it is not necessary for the user to store and recall information about the heap from which the data object was allocated. It will be appreciated that for large data objects (e.g. objects exceeding 512 bytes) the additional information in the size 102 and heap 104 fields, i.e. 8 bytes of data, is negligible when compared to the 512 byte size of the object.

However, it will be understood that the additional overhead for variable sized data object 100 can be detrimental to performance when the data objects are small resulting in memory wastage leading to swapper growth in the system. In situations where large numbers of small objects are being used, considerable demands will be placed on the memory resources and the manipulation of the overhead information for each object will affect execution speed. In some cases, the storage requirements for the overhead information will exceed the storage required for user area in the object itself. Accordingly, in a second aspect, the allocator/de-allocator 4 (FIG. 1) provides a mechanism for manipulating small data objects, for example, data objects less than 512 bytes.

According to this aspect of the invention, small data objects are "pooled" in a pool with other objects of the same size. The pool comprises one or more pages in memory and the heap and object size information are stored external to the data object.

Figure 3:
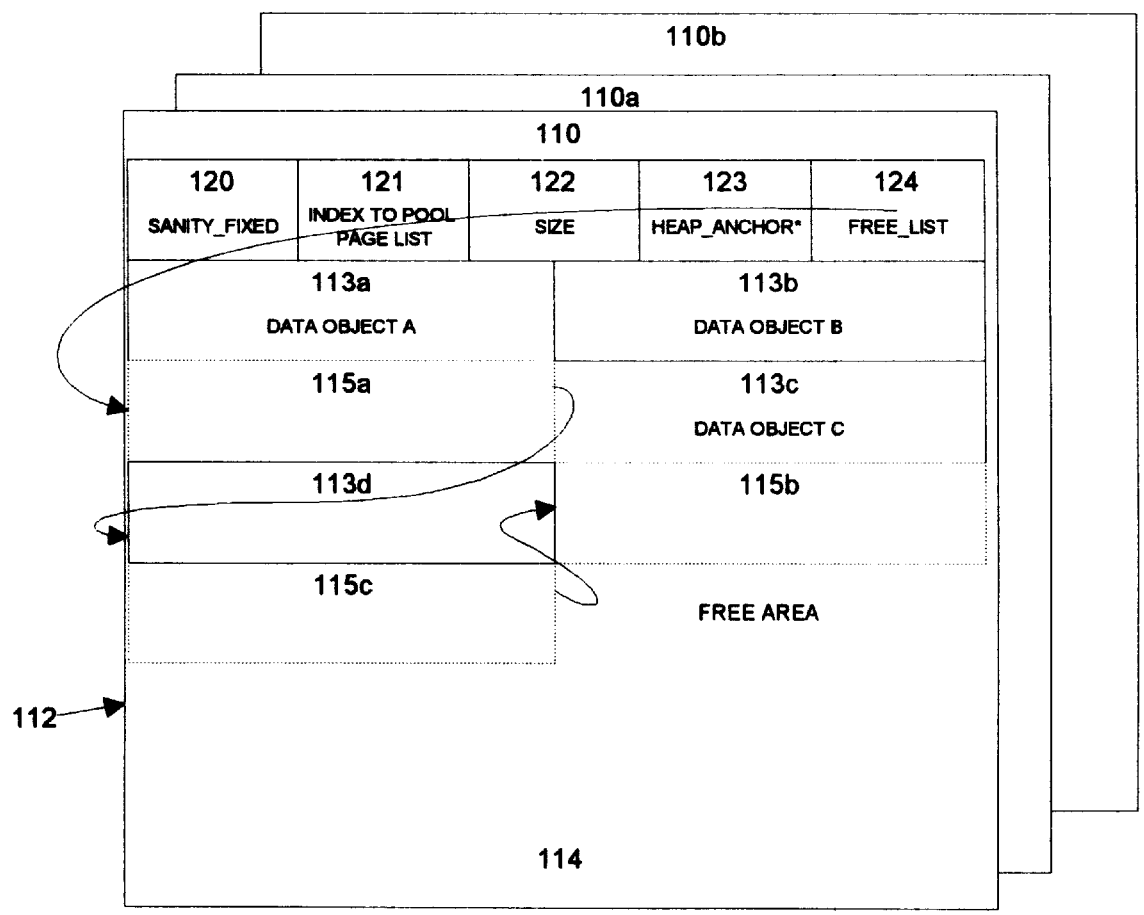
FIG. 3 is a schematic representation of a portion of a page generated by a fixed size object allocator according to another aspect of the present invention.

Reference is made to FIG. 3 which shows a pool page 110 for a fixed size object according to this aspect of the invention. In a typical 32-bit operating system, a memory page is 4096 or 4 K bytes. Depending on the storage needs, a pool for a fixed object size may comprise one or more pool pages 110, 110a, 110b shown in FIG. 3. The pool page 110 comprises a page header 111 and a page body 112. The page header 111 contains overhead information including the heap and the size of all objects allocated from the page 110. The page body 112 comprises the rest of the memory page 110 and is used for object allocations from the page 110. In FIG. 3, allocated data objects 113 are shown individually as 113a, 113b, 113c and 113d. The remaining un-allocated or "free area" portion of the page 110 comprises an area which has never been allocated and is denoted by 114. The returned or "freed" data objects are shown individually as 115a, 115b, 115c.

As shown in FIG. 3, the page header 111 comprises a sanity field 120, an index field 121, a size field 122, a heap field 123, and a free-list field 124. The sanity field 120 stores a "SANITY_FIXED" value which denotes the page as a pool for fixed size data objects 113. The SANITY_FIXED value comprises a fixed bit pattern which identifies a fixed size object. The index field 121 stores an index value to the page list array 8 (FIG. 1). This feature provides an integrity check for the sanity_fixed value during a de-allocation operation and is described in more detail below. The size field 122 stores the object size for the data objects 113 which are to be manipulated (i.e. allocated and de-allocated) in the particular pool page 110. The object size is preferably rounded to be a multiple of 4, 8 or 16 in order to facilitate alignment of data on natural boundaries. The size field 122 is also used in a method for managing pool pages which is described in a co-pending patent application under docket number CA9-97-0033 filed in the name of the common applicant.

Referring again to FIG. 3, the heap field 123 stores a heap_anchor which comprises an address pointer which points to the location of the heap structure 7. The heap_anchor and structure provide the capability for managing multiple heaps 6. (The heap_anchor structure is as described above.) The free-list field 124 stores a pointer 'free list' which points to the memory location in the pool page 110 of the next available data object which can be allocated in response to a user request. The allocation of free objects 113 in the page 110 is implemented using a "linked list" comprising a chain of addresses (i.e. pointers) corresponding to the un-allocated data objects 115 in the pool page 110 or series of pool pages 110a, 110b, . . . The free_list pointer points to the head of the linked list for the next available free object. For the example shown in FIG. 3, the free_list pointer points the beginning of un-allocated (i.e. returned) object 115a which, in turn, is chained to returned object 115c which is chained to returned object 115b. The returned object 115b points to the beginning of the free area 114.

Figure 4:
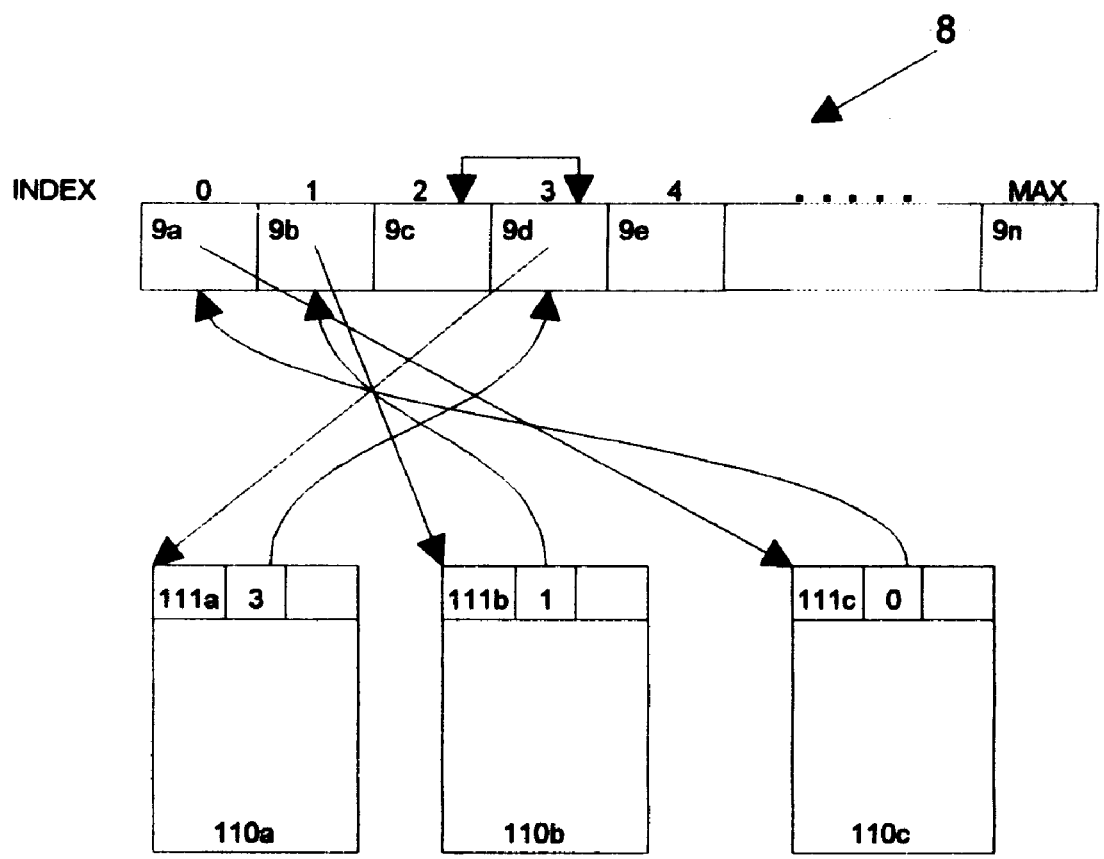
FIG. 4 is a schematic representation of a page list array according to another aspect of the invention.

Reference is made to FIG. 4 which shows the page list array 8 in more detail. The page list array 8 provides a further integrity check to ensure that an object being released is a fixed object derived from a page 110 and not a variable size object 100 (FIG. 2). The page list array 8 comprises an array structure with cells 9a, 9b, . . . 9n containing pointers to the respective pool pages 110. As shown in FIG. 4, the pointer to page 110a is stored in cell 9d and indexed in array 8 by the index 3. The pointer to page 110b is stored in cell 9b and indexed in the array 8 by the index 1. The pointer to page 110c is stored in cell 9a and indexed in the array 8 by the index 0. The page array 8 grows/shrinks as pages 110 are added/deleted from the pool. Unused or free cells 9c and 9e are linked together using known techniques in order to facilitate the addition of new page addresses.

The page list array 8 is created when the first runtime library is initialized within a process. The page list array 8 is preferably stored in memory where it is accessible to all future runtime libraries that will be initialized within the same process. The page list array 8 requires a semaphore which is used when a page entry, i.e. page address, is either inserted or removed from the array 8 for any heap within the process.

Figure 5:
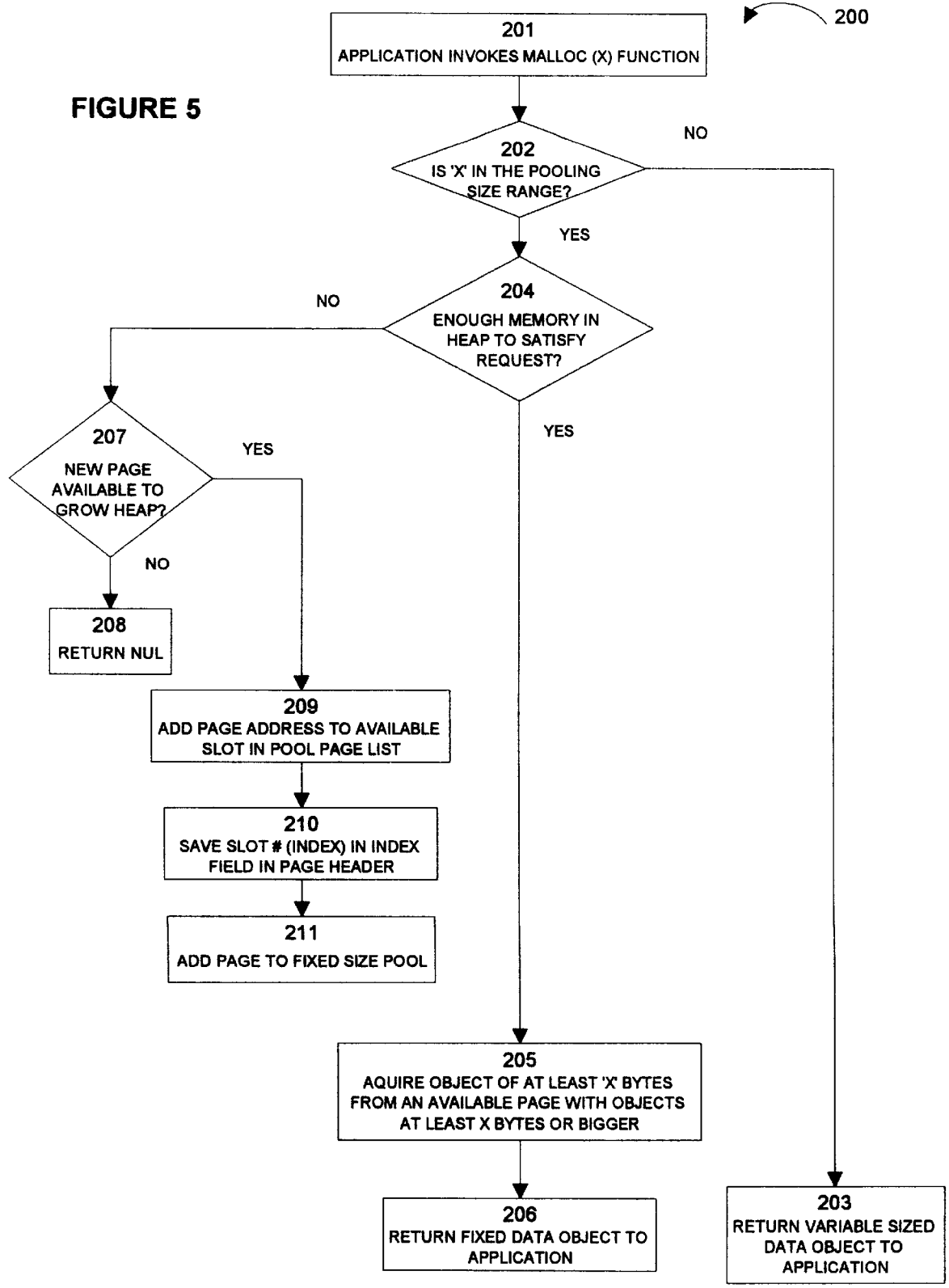
FIG. 5 is a flow chart showing computer implemented processing steps for a method for allocating fixed and variable size data objects in a multiple heap system according to the present invention.

Reference is next made to FIG. 5, which shows the processing steps performed by an allocation procedure 200 according to the present invention to execute a malloc( ) request. As depicted in step 201, a user application program invokes the function malloc(x) to allocate a data object having a size of "x" bytes. In decision step 202, the procedure 200 determines if the requested object falls into the fixed object category or the variable size object category based on the size "x" of the requested object. If the request object falls into the variable size category, a variable size object (i.e. of the type shown in FIG. 2) is returned (step 203).

If the requested object falls into a fixed object category, the procedure 200 checks if there is enough memory in the heap, i.e. the pool page 110 for the requested object size, to satisfy the request (decision step 204). If the request can be satisfied, the procedure 200 allocates a free fixed size object from a pool page having objects which are at least 'x' bytes in size (step 205). The next available fixed size object is selected using the free-list pointer described above. For the example shown in FIG. 3, the available object addressed by the free-list pointer 124 is object 115a in pool page 110. The free_list pointer is then updated to point at the location of the next available object, e.g. object 115b in FIG. 3. In step 206, the fixed data object (i.e. the address to the object) is returned to the application which invoked the function malloc( ).

Referring back to decision step 204, if additional memory is needed, the procedure 200 checks if a new pool page is available (decision step 207). The management of pages may be performed using known techniques as will be within the understanding of those skilled in the art. A novel method for the management of pool pages is the subject of a co-pending patent application (Docket No. CA9-97-0033) filed in the name of the common applicant may also be utilized. If a new pool page is not available, the malloc( ) function call returns a NULL value (step 208) which is processed by the application program. If an additional pool page is available in memory, the page (i.e. page address) is added to the page list in step 209. Next in step 210, the index or "slot number" for the new page is saved in the index field 121 (FIG. 3) for the page 110. In step 211, the page is added to the pool for the fixed size objects of interest. The procedure 200 then proceeds to allocate the requested fixed size object in the new pool page as described above for steps 205 and 206.

Figure 6:
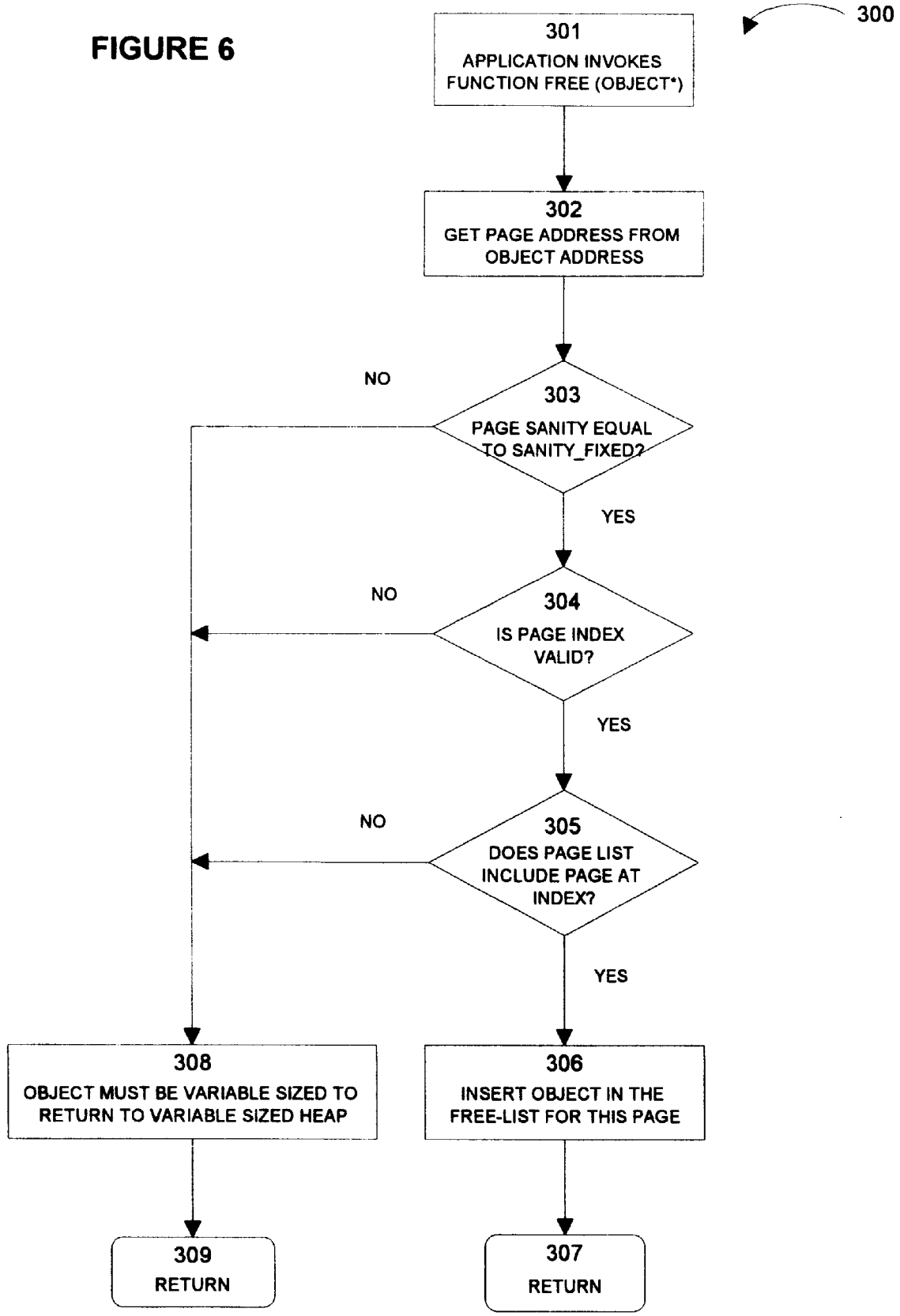
FIG. 6 is a flow chart showing computer implemented processing steps for a method for de-allocating fixed and variable size data objects according to the present invention.

Reference is next made to FIG. 6, which shows the processing steps performed by a de-allocation procedure 300 according to the present invention to execute a free( ) request. As shown in step 301, a user application invokes the function free(object_a) to free the "object_a". The parameter object_a comprises a pointer which points to the location of the object in the heap. The first operation to be performed is to determine if the object being "freed" is a fixed size object or a variable size object. In step 302, the method calculates a pool page address from the object address in order to determine if the object is a fixed size object which has been allocated from one of the pool pages. The pool page address is generated by masking a selected number of least significant bits in the object address. For example, in a 32-bit operating system, the least significant bits in the object address are masked, i.e. page_address= object_address AND 0XFFFFF000.

Once the address of the pool page is determined, the sanity value is read from the first field 120 in the page header 111 (FIG. 3). The sanity_fixed value in field 120 is compared to the fixed sanity value corresponding to the fixed object size of interest. If the sanity_fixed value 120 is valid, the procedure 300 preferably performs additional integrity checks in decision blocks 304 and 305. In step 304, the procedure 300 checks if the index value stored in field 121 of the pool page 110 (FIG. 3) is valid, i.e. within an acceptable range. If this test passes, the procedure 300 next checks in decision step 305 if the page list includes the address of the page at the location referenced by the index value. If this test also passes, the procedure 300 deallocates the fixed size object in step 306 by inserting the object in the free-list for the pool page from which the object was originally allocated.

Referring back to decision step 303, if the value in the sanity field 120 does not indicate a valid fixed object size or type (decision step 303), then it is assumed that the object is a variable size object. The variable size object is freed by moving to the memory location indicated by the original object address (i.e. the object address before the masking of the LSB) and then moving to the heap_structure referenced by the heap_anchor in field 104. The SANITY_VARIABLE in the heap_structure is then compared to the predetermined sanity value for variable size data objects to verify that the object is a valid variable size object. If the test passes the variable size object is de-allocated from memory based on its size. These operations are repeated if the outcome of decision steps 304 and 305 are negative. If the test for verifying the variable size object fails, the object is considered invalid. At this point, the invalid object can be ignored or a debug message can be generated.

The present invention can be extended to other types of "objects" and allocators. One such extension involves shared memory applications. In a shared memory system, a machine will have many processes with each running a program. Each process will have its own view of memory (i.e. virtual address) that does not affect any other program.

Shared memory is obtained from the operating system and an address is provided that is shared between all processes. Some users of multiple heaps may wish to create a shared heap for sharing between the processes. It will be appreciated by those skilled in the art that it is advantageous to pool the shared heap to reduce allocation and free times.

To implement a shared heap, a block of memory is allocated for the shared heap and "objects" within the block are handled as follows. The block includes a reserved portion for storing a sanity value and other control information for management of objects within the block (see FIG. 3 above). The sanity value, e.g. MED_SANITY, is stored in the first word of the block and is indicative of this type of object. Each of the objects includes a pointer which points to the address of the block. While this approach adds overhead to each object, the benefits of fast allocate/release operations are obtained. The method shown in FIG. 6 is modified to include an additional step to recognize the MED_SANITY value after the SANITY_FIXED value is checked in step 303.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for freeing fixed and variable size objects in response to a runtime free request from a user application executing in an operating system having a runtime library specifying the address of the object in memory, the object having been previously allocated in a memory heap, said method comprising the steps of:

(a) determining a pool page address from the address of the object to be freed and addressing said pool page;

(b) determining if the object to be freed is a fixed size object on the basis of a selected value stored in known location on the pool page addressed in step (a);

(c) if the object is a fixed size object, freeing the object from the pool page addressed in step (a);

(d) if the object is not a fixed size object, addressing the object to be freed and freeing the object as a variable size object.

2. The method as claimed in claim 1, wherein said step of determining a pool page address from the address of the object to be freed comprises masking a selected number of least significant bits in the pool page address to produce the address of the pool page for the object to be freed.

3. The method as claimed in claim 1, further including an integrity check for verifying that the pool page addressed in step (a) is a pool page for fixed size objects.

4. The method as claimed in claim 3, wherein said integrity check comprises utilizing a page list array to verify the pool page address, wherein each pool page includes an index value stored in a known location for indexing said page list array.

5. In a data processing system having multiple memory heaps, wherein said heap includes a pool page structure for storing fixed size objects, said pool page structure comprising:

(a) a pool page for each fixed size object of interest;

(b) each of said pool pages including a header portion and a body portion;

(c) said header portion comprising information fields for storing information corresponding to the fixed size object of interest, said information fields including an identification field for identifying the object type for that page, a heap field for identifying the heap for the object and a size field for indicating the size of object reserved for that page; and (d) said body portion providing means for allocating objects of the fixed size for said page.

6. The pool page structure as claimed in claim 5, further including a page list array for storing addresses of said pool pages, and each of said pool pages including an index value into said page list array, said index value being stored in an information field in the header portion of each page, and said page list array providing an integrity check for said pool pages.

7. The pool page structure as claimed in claim 5, wherein said body portion comprises space for returned objects and a free area.

8. Data storage media recorded with a computer program which, in combination with a general purpose computer loaded with an operating system and runtime library means, and equipped to read into memory and execute program data from the data storage media, comprises a method for freeing fixed and variable size objects in response to a runtime free request from a user application executing in said operating system wherein said runtime library means specifies the address of the object in memory, the object having been previously allocated in a memory heap, said method including the steps of:

(a) determining a pool page address from the address of the object to be freed and addressing said pool page;

(b) determining if the object to be freed is a fixed size object on the basis of a selected value stored in known location on the pool page addressed in step (a);

(c) if the object is a fixed size object, freeing the object from the Pool page addressed in step (a);

(d) if the object is not a fixed size object, addressing the object to be freed and freeing the object as a variable size object.

9. Data storage media recorded with a computer program as claimed in claim 8, wherein said method further includes an integrity check for verifying that the pool page addressed in step (a) is a pool page for fixed size objects.

10. Data storage media recorded with a computer program as claimed in claim 8, wherein said integrity check further comprises utilizing a page list array to verify the pool page address, wherein each pool page includes an index value stored in a known location for indexing said page list array.

* * * * *